United States Patent [19]  [11] 4,269,517
Sawamura et al.  [45] May 26, 1981

[54] MICROSCOPE FOR QUANTITATIVE DETERMINATION OF SUBSTANCE IN SPECIMEN

[75] Inventors: Ichiro Sawamura, Hachioji; Kensaku Miyazaki, Machida; Ken Yonekubo, Hachioji, all of Japan

[73] Assignee: Olympus Optical Co., Ltd., Tokyo, Japan

[21] Appl. No.: 834,896

[22] Filed: Sep. 20, 1977

[30] Foreign Application Priority Data

Sep. 25, 1976 [JP] Japan .................................. 51/114398

[51] Int. Cl.³ ............................................. G01J 3/42
[52] U.S. Cl. .................................... 356/432; 356/219; 356/226
[58] Field of Search ............... 356/201, 202, 204, 205, 356/218, 219, 226, 432; 350/81

[56] References Cited

U.S. PATENT DOCUMENTS

| 3,446,562 | 5/1969 | Caspersson et al. | 356/226 |
|---|---|---|---|
| 3,711,209 | 1/1973 | Caspersson et al. | 356/432 |
| 3,718,400 | 2/1973 | Yonekubo | 356/201 |
| 3,740,147 | 6/1973 | Kallet | 356/96 |
| 3,813,172 | 5/1974 | Walker et al. | 356/219 |
| 3,827,811 | 8/1974 | Kato et al. | 356/201 |
| 3,843,265 | 10/1974 | Egli et al. | 356/226 |
| 3,851,949 | 12/1974 | Kraft et al. | 356/219 |
| 4,071,299 | 1/1978 | Amano et al. | 356/202 |

OTHER PUBLICATIONS

Lison, L., "Histochemistry and Cytochemistry: Theory and Methods"; Translated into Japanese by Tadashi Imaizumi, published by Hakusui Sha Book Publishing Company, pp. 60-63 (1960).

Primary Examiner—Richard A. Rosenberger
Attorney, Agent, or Firm—Weinstein & Sutton

[57] ABSTRACT

A microscope comprises a full field illumination unit, a spot illumination unit using monochromatic light, means for adjusting the area of the spot region being illuminated, a light receptor for receiving light which is transmitted through a specimen, and an arithmetic unit connected with the light receptor for photometry. Full field and spot illuminations are activated simultaneously, and the position of a specimen is brought into alignment with a spot illuminated region while viewing the specimen. The area of the spot region being illuminated is adjusted so that it is substantially in conformity to the outline of the specimen. The arithmetic unit effects a quantitative determination of the total amount of light transmission through the specimen on the basis of an output from the light receptor and the area of the spot illuminated region.

8 Claims, 5 Drawing Figures

FIG. 1(A)
FIG. 1(B)
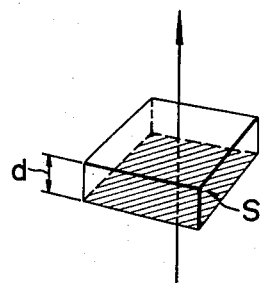
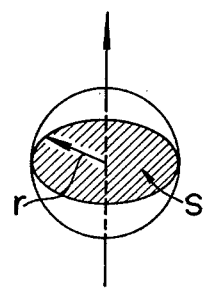
FIG. 2
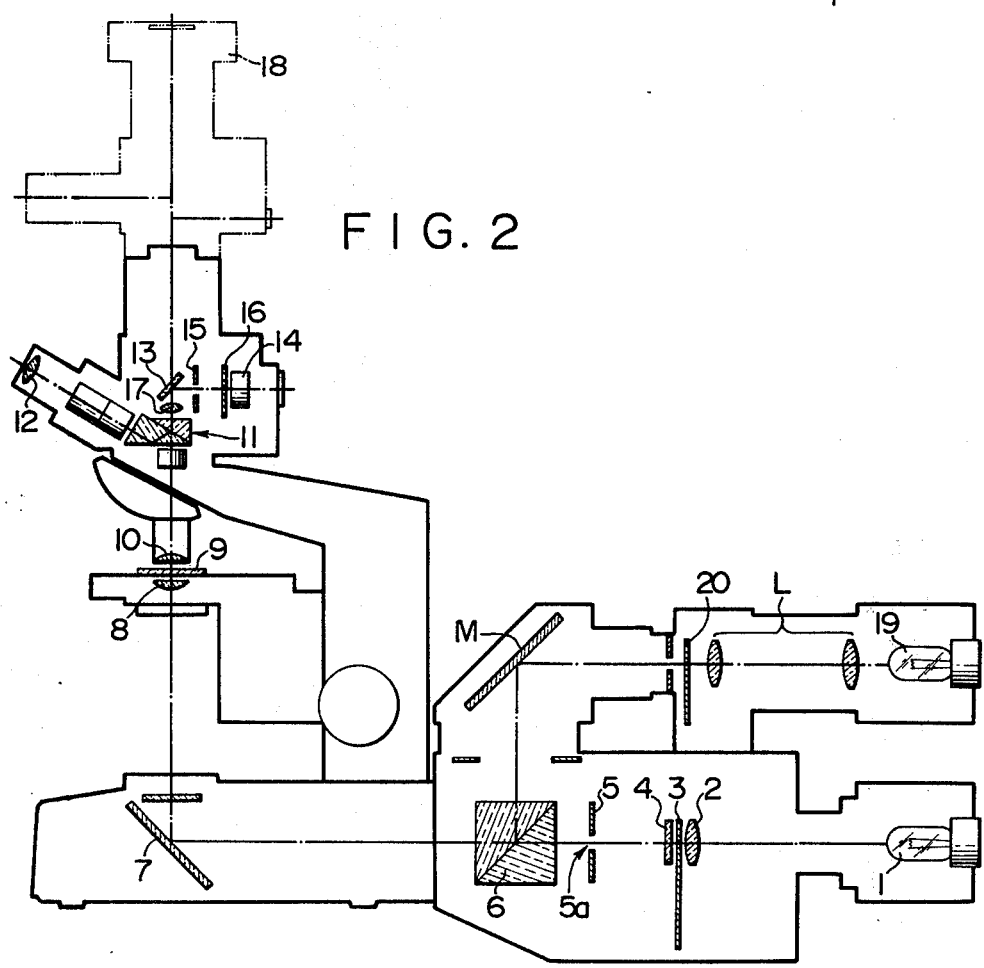

MICROSCOPE FOR QUANTITATIVE DETERMINATION OF SUBSTANCE IN SPECIMEN

BACKGROUND OF THE INVENTION

The invention relates to a microscope for quantitative determination of a substance in a specimen such as cancer cell.

Recently, the art of clinical examination has made a remarkable progress. In particular, chemical clinical examinations have achieved such a high level of automation and simplification that almost every examination, including highly complex examinations, can be made in a routine fashion. On the other hand, the automation and routinization of the examination employing microscopes is delayed in progress because the treatment and determination of specimens require skill as well as labor and time. By way of example, the diagnosis of cancer may utilize the examination of cells under a microscope, in particular in the area of cervical cancer which represents the highest frequency of malignant tumors in the field of gynecology in order to enable an early diagnosis and an early remedy. The examination of cells under a microsceope is recognized as a useful contribution to the early diagnosis, and has been employed in the screening and periodic examination schemes. As a result, the number of specimens examined in this manner is ever increasing. The diagnosis of cells under a microscope involves a subjective determination of morphological differences between normal and malignant cells, and the determination requires a high level of cytological knowledge and a close and careful examination. An exact and rapid determination of various features of a number of specimens such as the diameter of nucleus, N/C (nucleus per cytoplasm) ratio, nucleus staining, chromatin granule, nucleolus or the like is not readily attainable even by a skilled worker.

As a consequence, the decisions of physicians experienced in the diagnosis of cells may disagree. Therefore, it is important to the accuracy of determination that the subjective standards be removed from, but the objective standards be introduced into the determination during the diagnosis of cells. To employ the objective standards, it is necessary to consider the mensurability of a plurality of parameters which are utilized in the determination. An attempt is made recently to choose various mensurable parameters from morphological observations and to establish reference values for them which can be used in the quantitative determination between normal and abnormal conditions. This has led to a conclusion that the distinction between normal and abnormal conditions is possible by choosing the size of nucleus and the quantity of desoxyribonucleic acid.

SUMMARY OF THE INVENTION

It is an object of the invention to provide a microscope which enables a difficult examination such as the diagnosis of cells to be conducted in a facilitated and physical manner by a quantitative determination of the size and the total quantity of substance in a specimen.

In accordance with the invention, the size of a specimen and the total quantity of substance contained in the specimen are measured to establish standards for the quantitative determination for clinical purposes, thus rendering the determination, which has heretofore been a subjective determination, into an objective one and enabling the clinical microscope examination to be reduced to a routine which is comparable to microscope operations commonly found in the examining rooms.

As applied to the diagnosis of cells, novel microscope determines, for example, the size of nucleus and the quantity of desoxyribonucleic acid, thereby enabling a pre-screening of normal and abnormal cell diagnosis. This quantitative process can be developed into an automatic pre-screening technique which aids in the rapid processing of a large number of specimens and thereby increases with the popularization of the screening scheme.

BRIEF DESCRIPTION OF THE DRAWINGS

FIGS. 1A and 1B are schematic perspective views illustrating the relationship between the area and volume of several typical objects;

FIG. 2 is a schematic side elevation of the optical system of the microscope according to the invention;

DESCRIPTION OF PREFERRED EMBODIMENT

Figure 3:
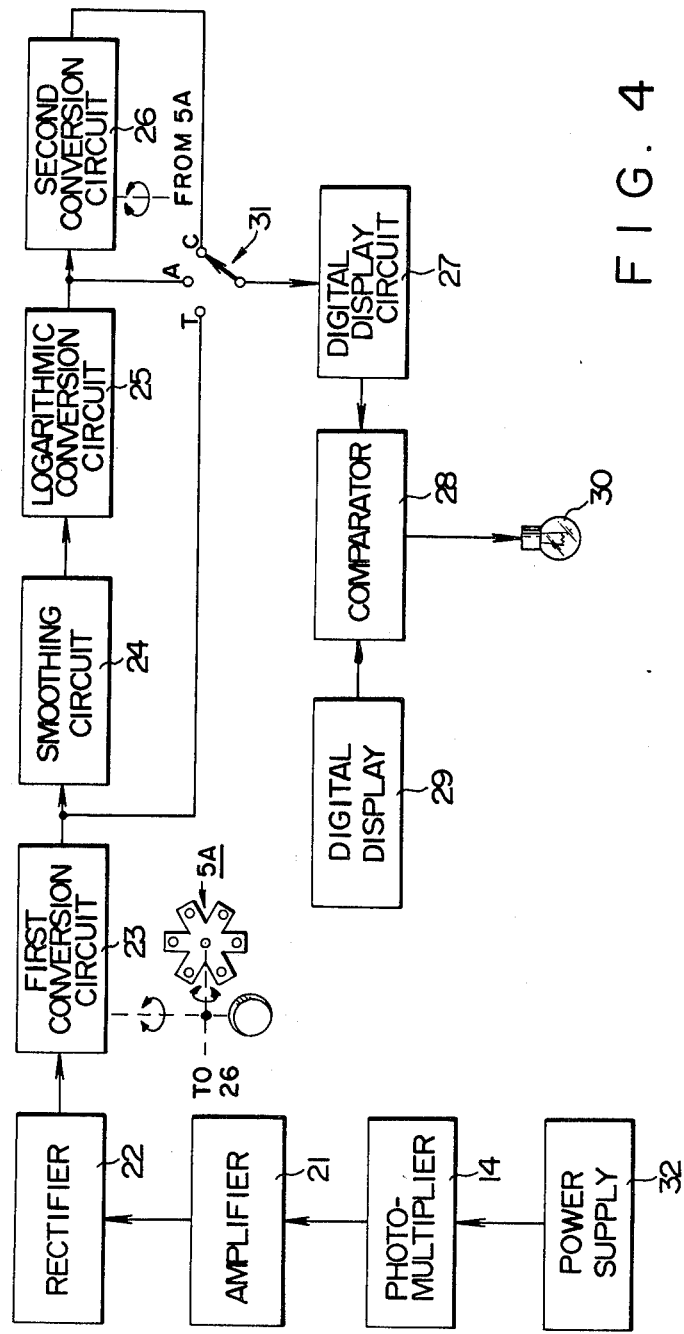
FIG. 3 is a block diagram of an arithmetic unit of the microscope.
Figure 4:
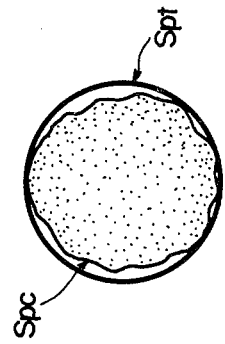
FIG. 4 is a top view showing that the spot illuminated region is brought into conformity to the outline of a specimen.

Before describing the construction of the invention, the underlying principle for the operation of the novel microscope will be mentioned first. The content or total quantity M of a substance contained in a specimen can be expressed by the following equation;

$$M = c \cdot V \tag{1}$$

where C represents the concentration of the substance in the specimen and V the volume of the specimen. According to the Lambert-Beer's law, the light absorption A of the specimen is given as follows;

$$A = q \cdot c \cdot d \tag{2}$$

where q represents a molecular light absorption coefficient of the specimen for a given wavelength and d the thickness of the specimen. This can be rewritten into the form $C = A/q \cdot d$ to define the concentration.

Assuming a parallelepiped configuration for the specimen as shown in FIG. 1A, and that the surface area of the specimen normal to the optical axis or the projection area is S, the volume V is given as follows;

$$V = d \cdot S \tag{3}$$

Thus the total quantity M of the substance in the specimen can be written as follows;

$$M = \frac{1}{q} \cdot A \cdot S = k \cdot A \cdot S \tag{4}$$

where k represents a constant of proportionality. For the spherical configuration of the specimen as shown in FIG. 1B, the concentration C is given by A/2qr, so that the total quantity M of the substance contained in the specimen will be $$M = \frac{2}{3} \cdot \frac{1}{q} \cdot \pi r^2 A = k' \cdot A \cdot S \tag{5}$$

where k' is another constant of proportionality. In either instance, the total quantity M is proportional to the product of the area S of a surface normal to the optical axis and the light absorption A. The purposes of the invention is the determination, not of the absolute value of the total quantity, but of the relative magnitudes of the total quantity between different cells or tissues. If the specimens to be compared are of an equal configuration, the relative quantity is given by the ratio of the products of the area and the light absorption of individual specimens.

The microscope according to the invention determines the total quantity of a substance contained in the specimen by adjusting the area of a spot illumination region Spt into conformity, and without substantial disagreement, with the outline Spc of a specimen, and using monochromatic light as the spot illumination to determine the area S and the light absorption A which is measured by the photometry of the light transmission.

Referring to FIG. 2, there is shown the optical system of the microscope of the invention. Specifically, the system includes a lamp 1 to be used as a source of spot illumination, and the image of the source 1 is focussed onto the entrance pupil of a condenser lens to be described later, through a field lens 2, chopper 3, interference filter 4 which is selectively used to match the maximum absorption wavelength of a specimen, and a pinhole assembly 5, all of which constitute together a monochromatic spot illumination unit. The pinhole assembly includes a plurality of pinhole blades having pinholes 5a of varying diameter formed therein and which are interchangeable so as to constitute means to adjust the area of the spot illuminated region.

After passing through the pinhole 5a, the monochromatic light passes through a half-transmitting prism 6, and is reflected by a reflecting mirror 7 to impinge an objective lens 8 used as a condenser lens and which forms a reduced image of the pinhole 5a on the surface of a specimen 9. An observation of the specimen 9 is made possible by an optical path including an objective lens 10, a path changing prism 11 and an eyepiece 12. A reflecting mirror 13 is disposed beyond the prism 11 in alignment with the optical path which precedes the latter to direct light to a photoelectric transducer element 14 such as photomultiplier which forms a light receptor. A stop 15 and a shutter 16 are interposed between the mirror 13 and the photomultiplier 14, and a lens 17 is disposed to project the pupil of the objective lens 10 onto the stop 15. A camera 18 may be attached to the system as shown in phantom lines. The optical system also includes a light source 19 which is used to provide an illumination of the full field of the microscope through lenses L, a reflecting mirror M and common optical elements 6 to 8 also employed for providing the spot illumination.

In operation, a spot illumination of the specimen 9 is achieved with monochromatic light while at the same time the source 19 is activated for illumination of the specimen 9 which provides a distinct vision thereof. In this manner, the specimen 9 can be viewed under both illuminations.

While viewing the spot illuminated region on the specimen 9 through the eyepiece 12, the pinhole blades 5 may be changed to adjust the size of the pinhole 5a so that the periphery of the spot illuminated region just circumscribes the outline of the specimen to be determined. Thereupon, the full field illumination from the source 19 is interrupted by the shutter 20, leaving only the spot illumination for photometry with the transducer element 14. Both the observation and the photometry can be achieved satisfactorily by adjusting the path changing prism 11 such that about 20% of the total light energy enters the observation path while the rest is directed to the photometry. A sliding reflective prism may be used as the prism 11 to enable nearly 100% of the light transmitted through the specimen to be utilized for observation purposes.

Referring to FIG. 3, there is shown the arithmetic unit which calculates the total quantity of the substance in the specimen or the aforementioned product of the light absorption and the area on the basis of the light transmission through the specimen under spot illumination and impinging on the photomultiplier 14. The arithmetic unit includes an amplifier 21 connected with the photomultiplier 14 and feeding a rectifier 22. A first conversion circuit 23 is connected with the rectifier 22 for converting a d.c. signal from the latter into a corresponding transmission rate per unit area. The amplification factor of the conversion circuit 23 is varied as the pinhole 5a is changed in inverse relationship with the area of the pinhole 5a selected. The circuit 23 feeds, through a smoothing circuit 24, a logarithmic conversion circuit 25 which converts a transmission rate signal into a light absorption signal. The circuit 25 in turn feeds a second conversion circuit 26 which converts the light absorption signal into a signal which is proportional to the total quantity. This conversion takes place by previously determining the area ratios of the pinholes 5a and changing the amplification factor of this conversion circuit in interlocked manner as the pinhole 5a is changed. A meter 27 serving as a digital display can be selectively connected with the output of the conversion circuits 23, 25 or 26 through a changeover switch 31, and is also connected with one input of a comparator 28, the other input of which is adapted to receive a reference value supplied through a switch 29. The comparator 28 causes a red lamp 30 to be illuminated whenever the signal supplied through the switch 31 exceeds a corresponding reference value. The photomultiplier 14 is shown connected with a power supply 32, which also feeds power to the entire circuit of the arithmetic unit.

In operation, the photomultiplier 14 produces an a.c. output signal since the monochromatic light used for the photometry is periodically interrupted by the chopper 3. A corresponding d.c. signal obtained at the output of the rectifier 22 is converted by the circuit 23 into a transmission rate per unit area, from which ripples are removed by the circuit 24. Then the transmission rate signal is converted by the circuit 25 into a light absorption signal, which is in turn converted into a signal representing the total quantity by the circuit 26. In the position C of the switch 31, the total quantity is displayed on the meter 27. Alternatively, in the positions T and A of the switch 31, the meter 27 provides a digital display of the transmission rate per unit area and the light absorption, respectively.

It should be noted that the photometric value thus obtained is based on the applicability of Lambert-Beer's law. In practice, however, it is understood that the actual specimens are not of ideal geometric configurations such as parallelepiped or sphere, and hence it follows that the misalignment between the outline of the specimen and the spot illumination region causes an error in the photometric value. However, it is found statistically that the error resulting from the misalignment is as low as 8% or less, and hence does not prevent the use of the invention in distinguishing between abnormal and normal cells. While a scanning integral technique is available to avoid errors resulting from such misalignment, the procedure required is complex and the scanning operation requires an exact movement of the microscope stage, resulting in a complex and expensive arrangement. As compared with such scanning technique, it is found that there is a close correlation between the photometric values obtained with the microscope of the invention and those obtained with the scanning technique, which justifies the described use of the invention.

It should be understood by those skilled in the art that a variety of changes and modifications of the described invention are possible without departing from the scope of the invention. For example, the pinhole blades may be changed either manually or automatically, or may be replaced by a mechanism which adjusts the cross-sectional area of the light flux providing the spot illumination.

What is claimed is:

1. A microscope for use in the quantitative determination of the substance in a specimen comprising:
   a full field illumination unit;
   a spot illumination unit using monochromatic light;
   a photoelectric transducer for receiving light which is transmitted through said specimen;
   an arithmetic unit connected to said photoelectric transducer for photometry;
   means for activating both the full field and spot illuminations to facilitate movement of the specimen into alignment with a spot illuminated region while observing the specimen; and
   adjustable aperture means for adjusting the amount of illumination so that the spot illuminated region is substantially in conformity with the outline of the specimen;
   said arithmetic unit including a first conversion circuit including means for converting a DC signal corresponding to the amount of the light transmitted through the specimen into a corresponding transmittance rate per unit area, said first conversion circuit including first means responsive to the adjustment of said adjustable aperture means for varying the amplification factor of said first conversion circuit in inverse proportion to the variation of the area of said spot illuminated region, and a second conversion circuit including means responsive to the adjustment of said adjustable aperture means for varying the amplification factor of said second conversion circuit for converting an absorbance signal into an output signal which is proportional to the total quantity of the substance contained in the specimen when the field illumination unit is turned off, said output signal being a function of the product of an output from said photoelectric transducer and the area of the spot illuminated region, said second conversion circuit including second means for varying the amplification factor of said second conversion circuit in direct proportion to the variation of the area of said aperture.

2. A microscope according to claim 1 in which said aperture means for adjusting the area of the spot illuminated region comprises a plurality of interchangeable pinhole blades formed with pinholes of varying diameter, each blade being adapted to be to be selectively positioned in the path of the monochromatic light emitted from the spot illumination unit.

3. A microscope according to claim 1, wherein said aritmethic unit further includes a photomultiplier for producing a signal dependent on the light transmitted through said specimen, a rectifier for converting the signal output of said photomultiplier to a DC signal and for supplying said DC signal to said first conversion circuit, a logarithmic conversion circuit between said first and second conversion circuits, a digital display circuit for receiving the signal from said second conversion circuit to produce a display of the total quantity of substance contained in the specimen.

4. Microscope apparatus for analyzing specimens and being comprised of:
   a spot illumination unit;
   a microscope stage for receiving a specimen;
   optical means for focusing light from said spot illumination unit to produce an illuminated spot upon a specimen positioned upon said stage;
   viewing means and light sensitive transducer means;
   second optical means for directing portions of light transmitted through the specimen to the viewing means and to the transducer means;
   said transducer means generating a signal representative of the light transmitted through the specimen;
   field illumination means for illuminating a specimen in said stage to facilitate alignment of a substance in the specimen with the illuminated spot;
   means for adjusting the illumination from the spot illumination unit to substantially conform to the size of the substance;
   means responsive to said adjusting means for modulating the output of said transducer means to generate a signal representative of the transmission rate of light per unit area;
   an arithmetic unit connected to said transducer means; and
   means for de-energizing the field illumination means to enable the transducer means to generate said signal to said arithmetic unit which facilitates a quantitative determination of the total quantity of the substance contained in the specimen.

5. The apparatus of claim 4 further comprising a first logarithmic conversion circuit coupled to said modulating means for generating a light absorption signal.

6. The apparatus of claim 5 further comprising a second conversion circuit responsive to the spot size adjusting means for generating a signal representative of the total quantity of the examined substance.

7. The apparatus of claim 6 comprising display means and means for selectively coupling the output of either the modulating means, the first conversion circuit or the second conversion unit to said display means.

8. The apparatus of claim 6 further comprising adjustable reference signal generating means for providing a reference signal; switch means having an output comparator means for comparing the signal appearing at the output of said switch means with said reference signal, and including alarm signal means providing a first indication when said reference signal is greater than the output of said switch means and for providing a second indication when said reference signal is less than the signal at said switch means output.

* * * * *

UNITED STATES PATENT AND TRADEMARK OFFICE
CERTIFICATE OF CORRECTION

PATENT NO. : 4,269,517
DATED : May 26, 1981
INVENTOR(S) : Ichiro Sawamura, Kensaku Miyazaki & Ken Yonekubo It is certified that error appears in the above—identified patent and that said Letters Patent is hereby corrected as shown below:

Column 1, line 10, delete "a".

Column 1, line 48, change "mensurable" to --measurable--.

Column 2, line 2, delete "the".

Column 3, line 2, change "purposes" to --purpose--.

Column 1, line 25, change "microsceope" to --microscope--.

Signed and Sealed this

Sixth Day of October 1981

[SEAL]

Attest:

Attesting Officer

GERALD J. MOSSINGHOFF

Commissioner of Patents and Trademarks